(12) United States Patent
Gautam et al.

(10) Patent No.: US 11,354,593 B2
(45) Date of Patent: Jun. 7, 2022

(54) TECHNIQUES TO GENERATE NETWORK SIMULATION SCENARIOS

(71) Applicant: SubCom, LLC, Eatontown, NJ (US)

(72) Inventors: Shreya Gautam, Red Bank, NJ (US); Yunlu Xu, Howell, NJ (US); Richard Kram, Ocean, NJ (US); Jonathan Liss, Marlboro, NJ (US)

(73) Assignee: SubCom, LLC, Eatontown, NJ (US)

( * ) Notice: Subject to any disclaimer, the term of this patent is extended or adjusted under 35 U.S.C. 154(b) by 269 days.

(21) Appl. No.: 16/441,160

(22) Filed: Jun. 14, 2019

(65) Prior Publication Data

US 2020/0394554 A1 Dec. 17, 2020

(51) Int. Cl.
*H04L 29/02* (2006.01)
*G06N 20/00* (2019.01)
*H04B 10/25* (2013.01)
*H04B 10/80* (2013.01)
*H04L 41/08* (2022.01)
*H04L 41/12* (2022.01)
*H04L 41/16* (2022.01)
*H04J 14/02* (2006.01)
*H04L 41/06* (2022.01)

(52) U.S. Cl.
CPC ............ *G06N 20/00* (2019.01); *H04B 10/25* (2013.01); *H04B 10/80* (2013.01); *H04L 41/08* (2013.01); *H04L 41/12* (2013.01); *H04L 41/16* (2013.01); *H04J 14/02* (2013.01); *H04L 41/06* (2013.01)

(58) Field of Classification Search
CPC .......... H04L 41/16; H04L 41/12; G06N 20/00
See application file for complete search history.

(56) References Cited

U.S. PATENT DOCUMENTS

| 10,614,365 | B2 * | 4/2020 | Sathish | G06N 20/00 |
| 2020/0267580 | A1 * | 8/2020 | Gray | H04L 12/2861 |
| 2020/0313977 | A1 * | 10/2020 | Kapinos | H04L 41/16 |
| 2020/0389500 | A1 * | 12/2020 | O'Neil | G06N 7/005 |

OTHER PUBLICATIONS

EP Extended Search Report dated Oct. 26, 2020, for the EP Patent Application No. 20176056.8, filed on May 22, 2020, 10 pages.
(Continued)

*Primary Examiner* — Adnan M Mirza
(74) *Attorney, Agent, or Firm* — KDB Firm PLLC

(57) ABSTRACT

Techniques to generate network simulation scenarios are described. In one embodiment, an apparatus may comprise a records component operative to receive an example network configuration record; receive an example network operation record; a machine learning management component operative to generate a network operation model using a machine learning component based on the example network configuration record as an example input and the example network operation record as an example output; and a system-test component operative to receive a system-test network configuration record; and generate a system-test network operation record based on the system-test network configuration record using the network operation model. Other embodiments are described and claimed.

20 Claims, 11 Drawing Sheets

(56) References Cited

OTHER PUBLICATIONS

Li-Qiong Deng et al: "Design of architecture and function for distributed communication network simulation training system (DCSS)", 2016 First IEEE International Conference on Computer Communication and the Internet (ICCI), IEEE, Oct. 13, 2016, (Oct. 13, 2016), pp. 108-111, XP033019419, DOI: 10.1109/CCI.2016.7778888, ISBN: 978-1-4673-8514-5, [retrieved on Dec. 8, 2016].

Sutar Shantanu et al: "Defect Prediction based on Machine Learning using System Test Parameters", 2019 Amity International Conference on Artificial Intelligence (AICAI), IEEE, Feb. 4, 2019 (Feb. 4, 2019), pp. 134-139, XP033543069, DOI: 10.1109/AICAI.2019.8701345, [retrieved on Apr. 26, 2019].

Nathalia Nascimento et al: "Testing Self-Organizing Multiagent Systems", arxiv.org, Cornell University Library, 201 OLIN Library Cornell University Ithaca, NY 14853, Apr. 3, 2019 (Apr. 3, 2019), XP081164192.

\* cited by examiner

TECHNIQUES TO GENERATE NETWORK SIMULATION SCENARIOS

TECHNICAL FIELD

The present disclosure relates to optical communication systems, and in particular, the simulation of undersea fiber optic transmission systems using artificial intelligence methods and applications.

BACKGROUND

When developing undersea optical communication systems, it is valuable to test the Network Management System (NMS) and operation thereof prior to and after deployment. These communication systems typically consist of a variety of interconnected network elements (NE or NEs) each of which may perform according to details particular to their design and construction. NEs may include, without limitation, transmitters, receivers, repeaters, couplers, branching units, and various other components that make-up a typical undersea optical communication system. These NEs may be also be configured to communicate operational information about the communication system, nodes that made up the system, and components therein to the NMS. Unfortunately, it may not be economical or feasible to create and configure the actual hardware representing these NEs in a lab to test the NMS system as it might consist of hundreds of physical elements not conducive to laboratory replication. Accordingly, software has been developed to simulate the operation of such systems and NE functionality within these communication systems. However, current software used to simulate such systems and NE functionality employ static environment-based behavioral files and databases which support hard-coded and sometimes manually created NE functions and responses. This static environment provides only limited system replication and hardware emulation and requires manual intensive editing in order to introduce new use cases. Thus, current simulation techniques are limited in their applicability based on the particular system architecture and do not allow for machine learning based simulators to more accurately create system simulation environments.

SUMMARY

The following presents a simplified summary in order to provide a basic understanding of some novel embodiments described herein. This summary is not an extensive overview, and it is not intended to identify key/critical elements or to delineate the scope thereof. Some concepts are presented in a simplified form as a prelude to the more detailed description that is presented later.

Various embodiments are generally directed to techniques to generate network simulation scenarios using a network operation model employing machine learning techniques. In one embodiment, for example, an apparatus may comprise a component operative to receive an example network configuration record; receive an example network operation record; a machine learning management component operative to generate a network operation model using a machine learning component based on the example network configuration record as an example input and the example network operation record as an example output; and a system-test component operative to receive a system-test network configuration record; and generate a system-test network operation record based on the system-test network configuration record using the network operation model. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1A:
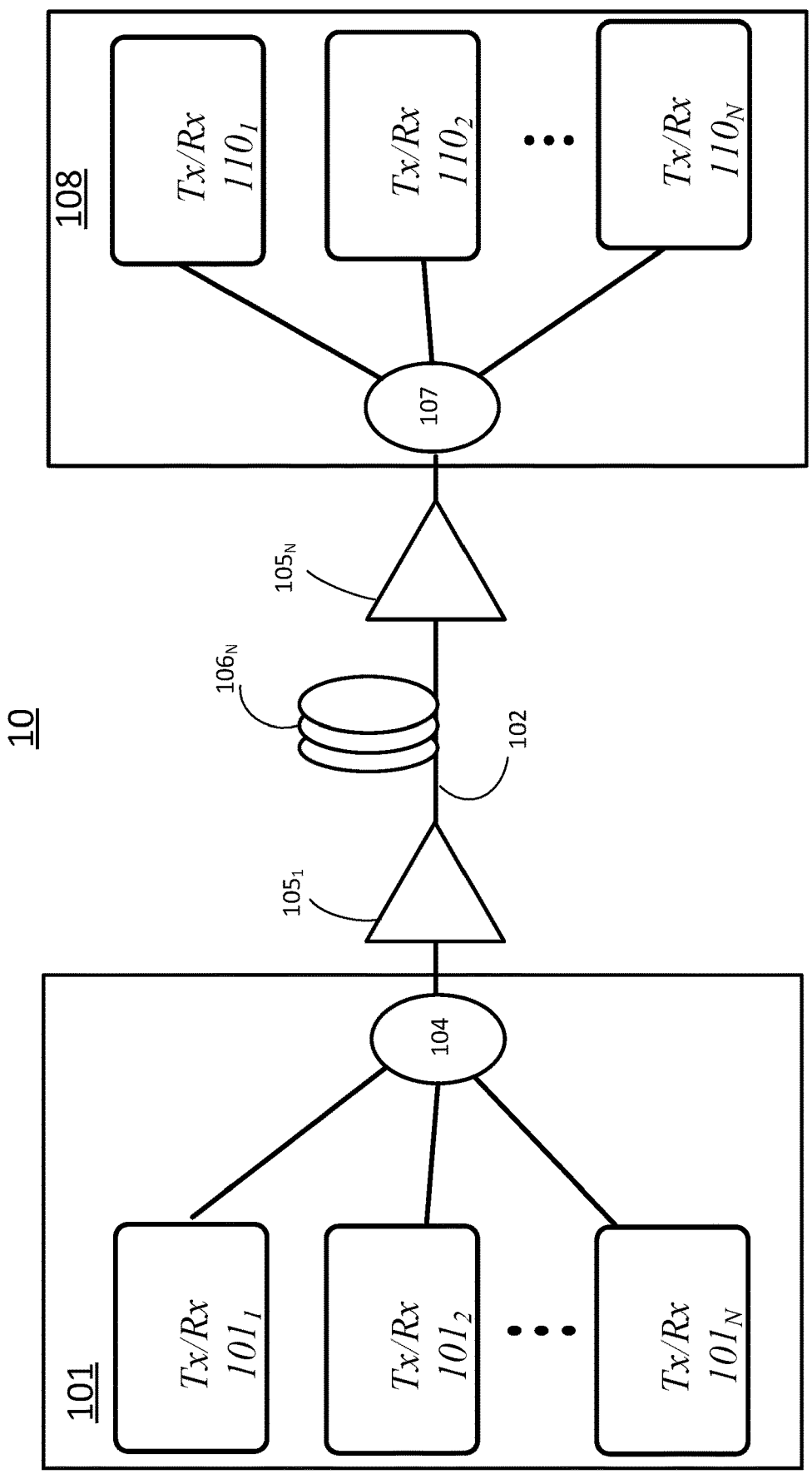
FIG. 1A illustrates a simplified block diagram of an undersea optical transmission system in connection with the present disclosure.

As noted above, current undersea fiber optic communication system software simulators may use a static simulation environment based on files and databases supporting a hard-coded simulation of network element responses and alarm events. These simulators execute on a computer system and replicate network element behavior in the absence of the physical hardware based on data sets containing static responses. The files supporting the simulator may be created by hand and consist of fixed key-value pairs indicating the output parameters of the network elements. The management software may function as in a real-world environment, but with only partial functionality achieved because of the static file structure. Thus, behavior replication only partially models a real-world communication system.

Instead, simulation systems would preferably be flexible and configurable to support both small and very large system configurations while dynamically reacting as close to the actual hardware at the system level as can be achieved as behavior one NE could impact behavior of other NEs. In order to address the disadvantages associated with static simulation and time-consuming manual creation of simulator operations files, a machine learning based simulator generation method may be deployed. Provided with network element performance, configuration, and alarm information, the machine learning based simulation generator automatically generates the simulators for new and existing network elements. This provides network engineers the ability to easily create simulation environments for entire cable systems, with differing topologies and various deployments of NE combinations, that will accurately model those systems. Further, as operations information is collected, the simulations will become increasingly accurate as the system learns more about the configurations and functions being used.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

It is worthy to note that "a" and "b" and "c" and similar designators as used herein are intended to be variables representing any positive integer. Thus, for example, if an implementation sets a value for $\alpha=5$, then a complete set of components 122 illustrated as components 122-1 through 122-$\alpha$ may include components 122-1, 122-2, 122-3, 122-4 and 122-5. The embodiments are not limited in this context.

FIG. 1A illustrates a simplified block diagram of an exemplary optical transmission system utilizing wavelength division multiplexing (WDM) in accordance with an embodiment of the present disclosure. The optical transmission system 10 generally consists of terminal equipment 101 and 108 and an undersea optical cable 102 disposed therebetween to allow optical signals to be transmitted with high traffic capacity. In particular, a plurality of optical transmitters/receivers $101_1 \ldots 101_N$ generate optical signals at associated wavelengths or channels which are combined or multiplexed by multiplexer/demultiplexer 104 and transmitted along undersea optical cable 102 to receiver 110. Similarly, optical transmitters/receivers $110_1 \ldots 110_N$ generate optical signals at associated wavelengths or channels which are combined or multiplexed by multiplexer/demultiplexer 107 and transmitted along undersea optical cable 102 to receiver 101. The transmitters may be configured to generate optical signals using various modulation techniques including, without limitation QPSK, DPSK, RZ-DPSK, etc. The optical signals at the various wavelengths may be amplified by a plurality of optical amplifiers or repeaters $105_1 \ldots 105_N$ disposed along optical cable 102. Amplifiers $105_1 \ldots 105_N$ may be, for example, erbium doped fiber amplifiers, Raman amplifiers, and/or combinations thereof. Optical cable 102 may include a plurality of fiber sections of spans $106_N$ corresponding to the number of optical amplifiers $105_1 \ldots 105_N$. When the transmitted optical signals are received by terminal 108 from terminal 101, multiplexer/demultiplexer 107 separates the channels to each of the receivers $110_1 \ldots 110_N$. Similarly, when the transmitted optical signals are received by terminal 101 from terminal 108, multiplexer/demultiplexer 104 separates the channels to each of the receivers $101_1 \ldots 101_N$. Each of the terminals 101 and 108 may also include dispersion compensation modules, power feed equipment as well as line monitoring equipment depending on the desired system architecture as is well known in the art. In addition, optical transmission system 10 may also include various other components including, but not limited to, branching units, repeatered and unrepeatered spans, and various couplers to provide the transmitted optical signals to multiple terminal locations. Each of the components (e.g. transmitters/receivers, multiplexer/demultiplexers, amplifiers, fiber spans, power feed equipment, etc.), within the system 10 may be referred to as NEs.

Figure 1B:
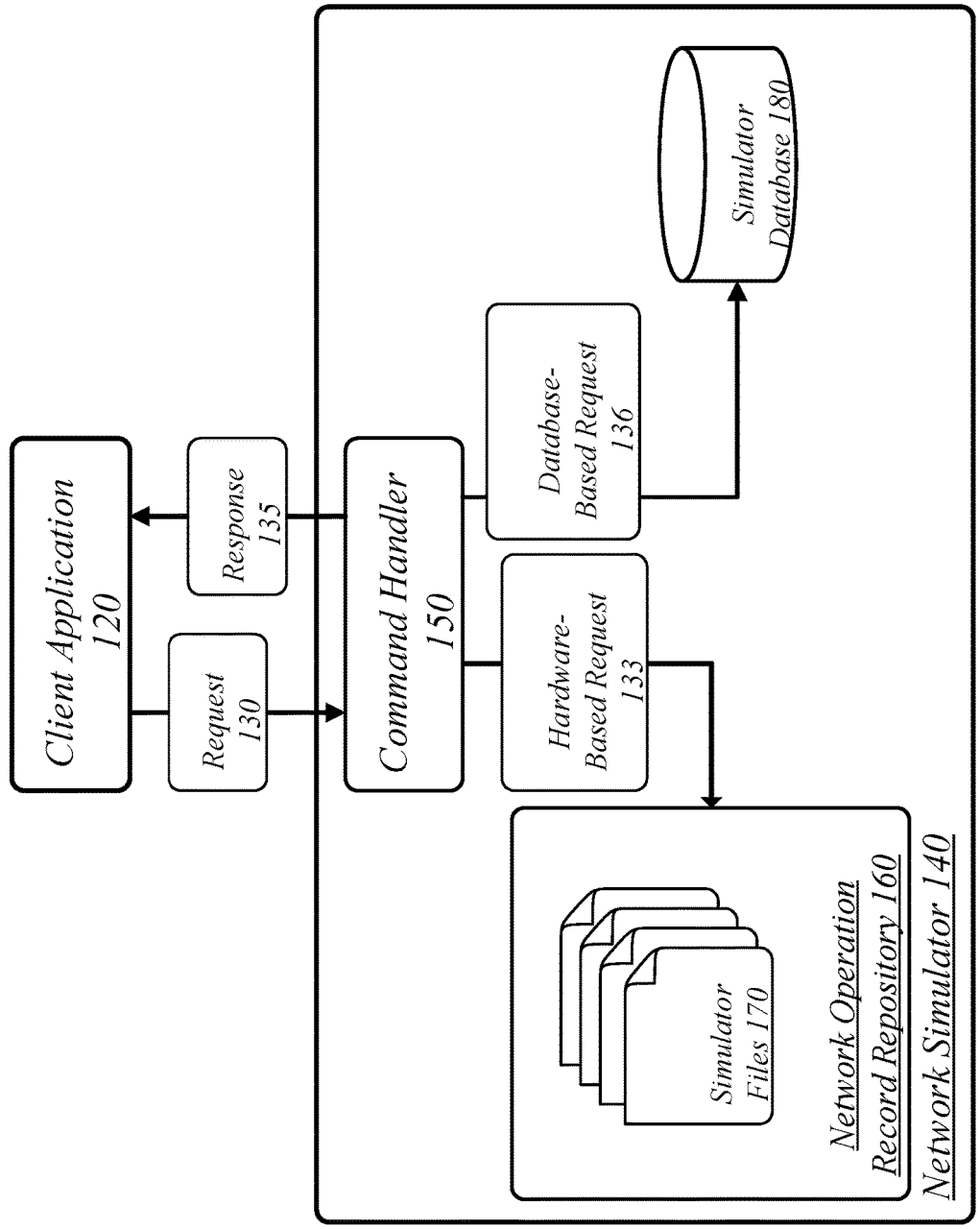
FIG. 1B illustrates an embodiment of a network modeling system.

FIG. 1B illustrates a block diagram for a network modeling system 100 used to model the exemplary optical transmission system 10 shown in FIG. 1A. The network modeling system 100 may comprise a computer-implemented system having software applications comprising one or more components. Although the network modeling system 100 shown in FIG. 1B has a limited number of elements in a certain topology, it may be appreciated that the network modeling system 100 may include more or less elements in alternate topologies as desired for a given implementation.

A client application 120 interacts with a network simulator 140 in the simulation of an undersea optical communication network. The client application 120 may comprise a network management application operative to manage a communication network. The client application 120 may receive and display network operations information for a user and may correspond to the operations of the network and its constituent network elements. The client application 120 enables a user to manage the operation of a communication network and may send a request 130 to the network simulator 140 and receive a response 135. A network operation record repository 160 stores simulator files 170 which define the behavior of communications (e.g., message construction rules) between the network elements and the client application 120. The network simulator 140 via a command handler 150 manages the routing of requests to different network elements, using a simulator database 180 to contain the commands required to execute different behaviors, such as, for example, generating an alarm based on the values in the simulator files 170. Where the request 130 is a hardware-based request 133, the hardware-based request 133 may be processed by the command handler 150 based on the simulator files 170. Where the request 130 is a database-based request 136, the database-based request 136 may be processed by the command handler 150 based on the simulator database 180.

Automatic network element simulator generation may comprise at least three stages. A first stage may comprise collecting the hardware specification files defining network element information. The network element information may comprise communication rules, configuration commands, alarms, events, and performance data generated by the client application 120 along with a list of all alarms and other database files for a network element specifying its behavior and purpose.

A second stage may comprise feeding the collected files of network elements behaviors as input examples for training data into a simulator classifier which can be an unsupervised machine learning system. As is known, the undersea cable systems have similarities and distinctions in various aspects. A terminal loading equipment shares more similarities with a dual terminal loading equipment, which has a primary and redundant pair of terminal loading equipment, than with a line monitoring equipment. The simulation file generation of the third step could be largely simplified by properly classifying the network elements into different categories so that each individual category of network elements will have a specific file generator.

A third stage may comprise feeding the collected files of the behaviors of NEs as input examples for training data into a simulator file generator which can be a supervised machine learning system. An existing simulator file, created in the previous systems by hand for the simulation of NEs like line monitoring equipment, power feeding equipment, etc., may be provided as the clearly labelled desired output of the training data to regulate the export of the machine learning system for the simulation of the undersea cable elements. The machine learning system attempts to learn how to generate the desired output of the training data based on the specified input examples of the training data under the supervision of human definition which was previously created by hand, either through convolutional neural network, recurrent neural network or other methods appropriate for such a purpose.

The training data may comprise a collection of different types of data. The training data may include NE definitions defining the behavior of NEs. The training data may include an alarm database defining the types of alarms that may be produced by the NEs and may comprise system data collected during operation. The training data may also comprise simulator templates defining the form of simulator data including creation commands defining what particular NEs should be included in a modeled network and in what configuration.

Figure 2A:
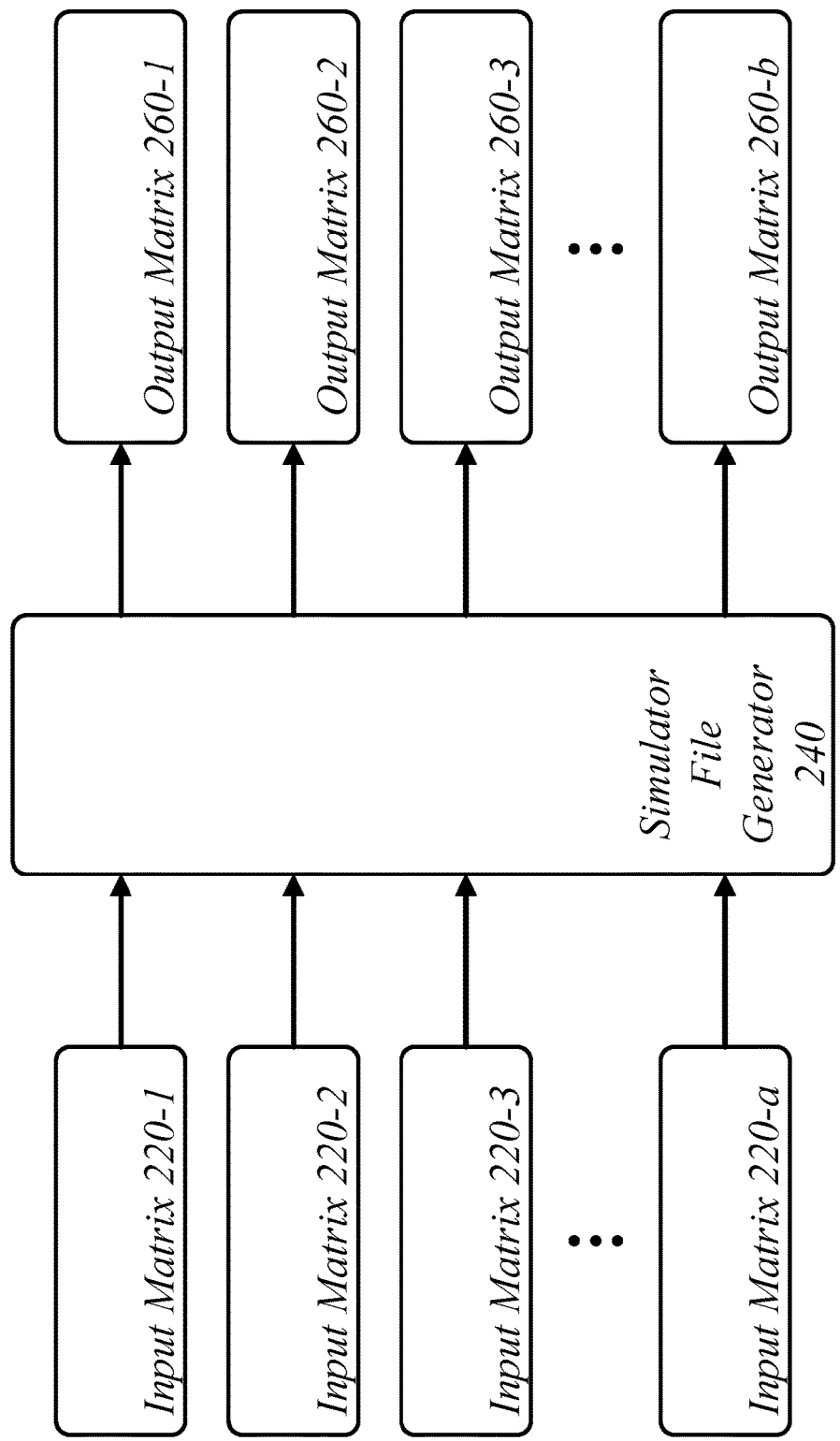
FIG. 2A illustrates an embodiment of a simulator file generator producing output matrices from input matrices.

FIG. 2A illustrates an embodiment of a NE simulator file generator 240 producing output matrices 260 from input matrices 220. The NE information may be organized into a plurality of input matrices 220 where each NE has different parameters or values that may be used to define its simulation. These parameters may define alarms, events, and network performance data which may be vectorized and stored in the input matrices 220 in preparation for serving as the input to the NE simulator file generator 240. In particular, a number of different training models may be used for the creation of the simulator file generator 240. The input matrices 220, comprising vectorized topology information, alarm information, event information, and command specifications may be sent to the training model as exemplary inputs.

Figure 2B:
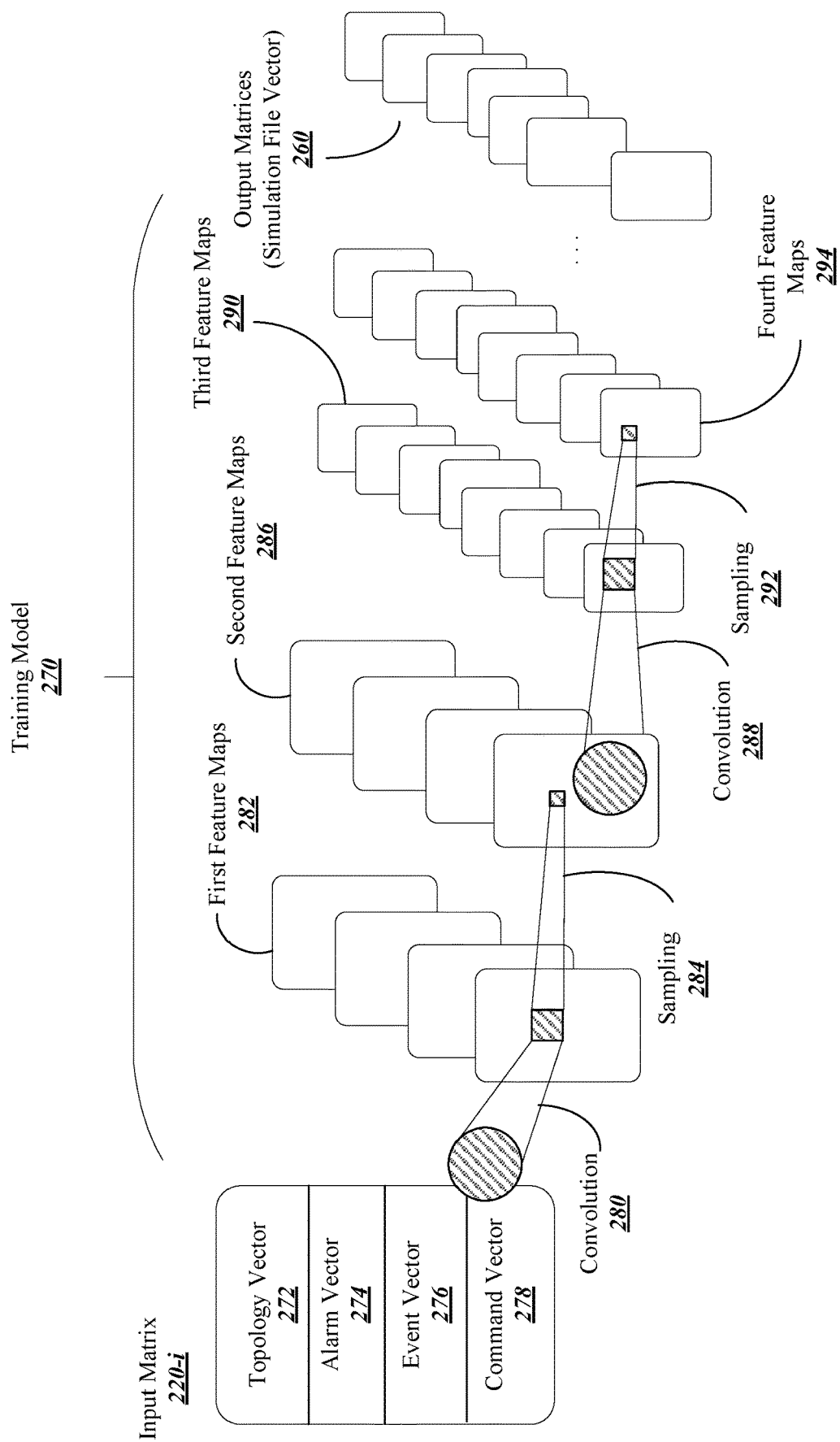
FIG. 2B illustrates an embodiment of a training module.

The corresponding vectorized simulator files, represented in the output matrices 260, are used to train a machine learning training model 270, as shown in FIG. 2B. The training model is trained to receive, as an input, a matrix 220-$i$ including one or more vectors representing network topology 272, alarms 274, events 276, and commands 278. The vectorized simulator files are provided to the training model as example outputs. The output matrices 260 may comprise values representing one or more of network element alarms, network element inventory, network element data sets, network element operating mode, network element voltage readings, network element configuration information, and any other performance data provided by network elements. The training model 270 learns to map input conditions represented by the input vectors 220 to output conditions represented by the output matrices 260 by comparing results from the software simulator with expected output results in the output matrices.

The training model 270 may be any suitable type of machine learning structure, such as an Artificial Neural Network (ANN), a Bayesian Network, a genetic algorithm, etc. In a preferred embodiment depicted in FIG. 2B, the training model 270 may be structured as a convolutional neural network. Convolutional neural networks are a particular type of ANN in which the nodes of a given layer within the network connect to only a subset of nodes in the preceding layer. For example, in FIG. 2B, the nodes are represented as elements of feature maps 282, 286, 290, 294. A convolution 280 is applied to different subsets of the data in the input matrix 220-$i$, which are combined to provide the input into a node in the first layer 282 containing a first set of feature maps. Depending on the correlation of the vectors that are fed into the neural network, the alignments of each parameter in vectors and the construction process of the neural network, the hidden feature of those vectors can be extracted out in several layers. Those features include the fields where the status changes in common, the severity of the alarms and events, etc. When applying convolutions 280, 288, the number of nodes in the preceding layer that connect to a node of the next layer is referred to as the receptive field of that layer. Convolution layers, in which the receptive field is applied, may be supplemented by other types of layers, such as pooling layers, an activation function, normalization layers, etc. For example, convolved layers 282, 290 to which convolutions 280, 288 are applied may be interspersed with sub-sampled layers 286, 294 to which sampling 284, 292 is applied. Sampling refers to local averaging that is often used to reduce the resolution of a given feature map and extract the local feature. Those features in the end enable the construction of the final status bits that can be read by the status bits dependent NEs simulators to trigger certain alarms/events/inventory/topology changes that the users can see and validate the operation of the NEs even if they are not familiar with the status bits of the NEs simulators.

The nodes in each layer are activated (or not activated) based on the set of nodes in the receptive field and based on a vector of weights and biases referred to as a filter. The goal of training the model using the input matrix and output matrices is to establish a set of filters for the nodes that accurately maps the input matrix to the desired output matrices. Thus, the filters of the nodes may be randomly initialized then iteratively updated to produce a neural network that produces the output matrices 260 based on the input matrices 220. To this end, the neural network may be applied to the input matrices 220 by the simulator file generator 240 to produce actual output matrices, which are compared to the desired output matrices 260 that were generated from the simulator files. The difference between the actual output matrices of simulation files for the NEs and the desired output matrices 260 is then used to calculate updated coefficients for the filters that are used in an updated neural network that better extract the hidden feature in the NEs topology, alarms, inventory, etc., as may be performed using machine learning techniques.

Certain parameters of the network, such as the number of layers, number of feature maps and nodes per layer, size of the receptive fields of the convolutions, etc. are referred to as hyperparameters. These hyperparameters are selected before the model 270 is trained and are not changed during a single model training. The hyperparameters may be selected manually, or according to known automatic hyperparameter tuning techniques, and may be chosen on an application-by-application basis. For example, a NE with fewer attributes like switching wavelength management unit (sWMU) shall have fewer fields and simpler feature layers than a more complicated NE, like wavelength selective switch or redundant optical add and drop multiplexer (WSS ROADM) which can be viewed as an enhanced version of sWMU. However, since the command specifications of the NEs share similarities, it's ideal to have one neural network that is large and is capable of dealing with different NEs with unified generation of simulation files.

Once a neural network is configured, it may be used with additional NEs that may be defined using a combination of the existing parameters. Upon completion of an initial training, any new commands or other information for any new NE can be fed into the system to automatically generate updated simulator files expressing these additional NEs based on the system having learned from the previously-provided training data. These additional NEs may comprise hybrid network elements, which combine traits of multiple NEs. The simulator file generator 240 is operative to generate simulator files that incorporate these hybrid NEs based on its learning of the behavior of the base NEs that were hybridized into the hybrid NEs.

As such, the simulator file generator 240 may learn to construct simulator files that represent events within a communications network such as they would appear in an operational communication network. For example, if even a single repeater were to experience a malfunction or other hardware or software issue, it may be reflected in changes to the parameters of hundreds of other NEs. For example, a reduction in the output power of a repeater might result in a series of repeaters and branching units detecting the lowered input power (raising corresponding alarms), modifying their behavior to accommodate the lowered input power (changing various operating parameters), and so on. While these hundreds of parameters might be manually configured to reflect the one failure, the testing of network management software may be improved by the simulator file generator 240 being operative to automatically generate simulator files that reflect different scenarios. The training of the simulator file generator 240 prepares the neural network to produce the proper network element parameters given a particular scenario based on provided examples of input matrices 220 and output matrices 260.

Figure 3:
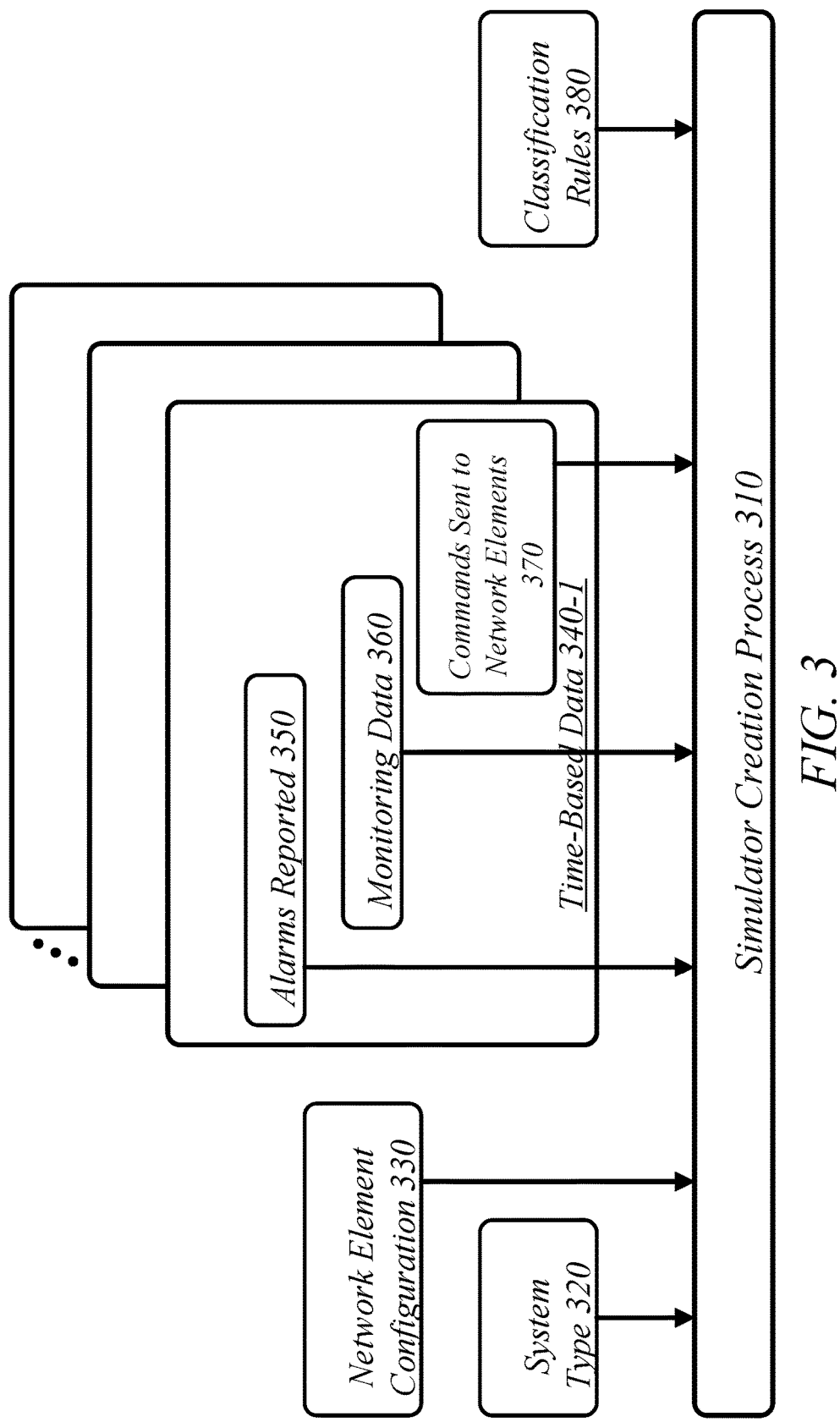
FIG. 3 illustrates an embodiment of a network modeling system processing input data.

FIG. 3 illustrates an embodiment of a network modeling system 100 processing input data in a simulator creation process 310. The network modeling system 100 creates a simulator for an undersea optical communication network based on sets of training data. The training data may include field data collected in real time from communication systems operating in the real world. The field data may be obtained from actual NE hardware and firmware. It includes the sequence of commands set out to the different network entities in the communication network, the performance data returned by the NEs in the communication network, and information about all of the NEs installed in the communication network. Performance data may be returned at constant time intervals and/or when a fault occurs and was reported.

The input training data may be a matrix or set of matrices with a vectorized form of the input training data. The output training data may comprise a manually-created simulator consisting of files that contain information on alarms and/or events along with a list of activities that generated them along with associated performance data. These manually-created simulator files may be generated based on real-world performance data and recorded activities, curated by an operator of the network modeling system 100. In some embodiments, real-world performance data and recorded activities may be automatically converted into simulator files.

The simulator creation process 310 may receive a system type 320 indicating a type of the communication network. A system type 320 may comprise a linear system, a branching system, or other network layout and may indicate an overall topography of the system, including a number of branches, repeaters, etc. as well as their layout. The simulator creation process 310 may receive a network element configuration 330 which provides information on the specific network elements used in the communication network.

The simulator creation process 310 may receive a series of time-based data 340 indicating performance data at various times, the time-based data defining sets of information over time. At each time instance, the time-based data 340 may indicate alarms reported 350, monitoring data 360, and/or commands sent to network elements 370. The simulation creation process 310 may also receive classification rules 380 which comprise rules for classification of different types of alarms and/or events along with activities associated with those types of alarms and/or events.

Figure 4:
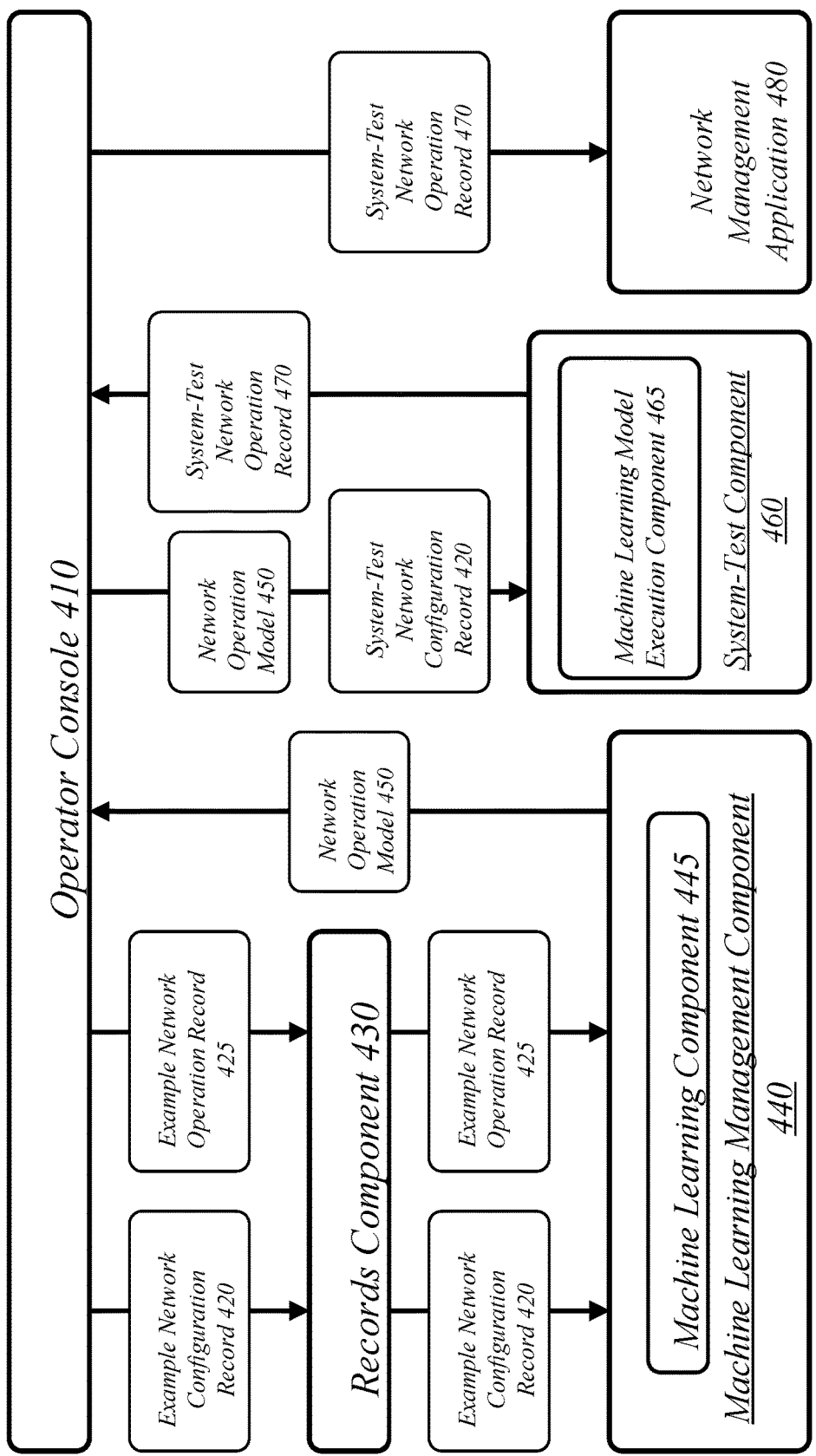
FIG. 4 illustrates an embodiment of a network modelling system producing a system-test network operation record based on a network operation model.

FIG. 4 illustrates an embodiment of a network modelling system 100 producing a system-test network operation record 470 based on a network operation model 450. The network modeling system 100 may be operated using an operator console 410 to manage the creation of simulator files for use by a network management application 480 being tested using the simulator files. The network management application 480 may perform software management operations representing optical communication networks. The simulator files may be used to test the network management application 480 in its performance of software management operations.

In particular, the network modeling system 100 comprises a records component 430 which is generally arranged to manage records used for the training of the network operation model 450 being generated for the creation of simulator files. The records component 430 receives an exemplary network configuration record 420 specified by the operator console 410. The example network configuration record comprises one or more of network topology information, network alarm information, network event information, and network command specifications. Network topology information indicates the topology of an example undersea communication system. Network alarm information specifies alarms that may be raised in the communication system and network event information specifies events that may be raised in the exemplary communication system. Network command specification specifies commands that may be sent by the network management application 480 to the example communication network.

The records component 430 also receives an example network operation record 425 specified by the operator console 410. The example network operation record 425 comprises one or more of network alarm alerts, network event alerts, network alarm data, and network event data. Network alarm alerts correspond to alarms raised in the communication network being simulated that would be received by a network management application 480 in the operation of the example communication network given the example network configuration record 420. Network event alerts corresponds to event alerts correspond to notifications of events raised in the communication network being simulated that would be received by a network management application 480 in the operation of the example communication network given the example network configuration record 420. Network alarm data indicates payload information for the alarm alerts describing the various alarms. Network event data indicates payload information for the event alerts describing the various events.

In some cases, real world data may be used. The example network configuration record 420 may correspond to an operating network. The example network operation record 425 may comprise operating data collected for the operating network. The example network operation record 425 may therefore comprise a plurality of example key-value pairs for example output parameters of a plurality of example network elements of an example network configuration represented by the example network configuration record.

The records component 430 feeds the example network configuration record 420 and example network operation record 425 into a machine learning management component 440 for the performance of machine learning operations on the example network configuration record 420 and example network operation record 425. The machine learning management component 440 manages the operations of a machine learning component 445 that may operate according to known machine learning techniques. The machine learning component 445 may be generally arranged to produce a network operation model 450 specifying the configuration of a neural network trained on the example network configuration record 420 and example network operation record 425.

The machine learning management component 440 generates a network operation model 450 using the machine learning component 445 based on the network configuration record 420 as an example input and the example network operation record 425 as an example output. The machine learning component 445 is used to generate a network operation model 450 that, given a particular network configuration, set of commands into that network, and events within that network, produces the monitoring information that a network management application 480 would be presented within the monitoring of that network configuration given those commands and events.

In particular, the machine learning component 445 may comprise a simulation file generator. Generating a network operation model using the machine learning component 445 may comprise iteratively submitting the example network configuration record to the simulation file generator 420, receiving an attempted network operation record in response, and iterating through configuration settings of the simulation file generator where the attempted network operation record does not match the example network operation record 425. The iteration may end when the example network operation record 425 and attempted network operation record exactly match, or when they match within defined tolerances. This iteration may comprise the training of a multi-layer neural network.

The network modeling system 100 comprises a system-test component 460. The system-test component 460 is operative to execute the simulation of a communication network. The system-test component 460 may generally correspond to the network simulator 140 described with reference to FIG. 1. The system-test component 460 may similarly correspond to the simulator file generator 240 described with reference to FIG. 2. The simulator file generator 240 may comprise a machine learning component 445 paired with the network operation model 450 as the configuration of a neural network of the machine learning component 445.

The system-test component 460 executes the network operation model 450 via a machine learning model execution component 465. The machine learning model execution component 465 may generally be the same as the machine learning component 445. The machine learning component 445 may configure a neural network based on the example network configuration record and example network operation record 425 whereas the machine learning model execution component 465 performs that neural network to convert the system-test network configuration record 420 into a corresponding system-test network operation record 470.

The network operation model 450 is provided to the system-test component 460. In some embodiments, the system-test component 460 may receive the network operation model 450 via an operator console 410. In other embodiments, the system-test component 460 may directly receive the network operation model 450 from the machine learning management component 440. The system-test component 460 receives a system-test network configuration record 420 specified by the operator console 410. The system-test network configuration record 420 comprises one or more of network topology information, network alarm information, network event information, and network command specifications. The network topology information, network alarm information, network event information, and network command specifications are specified according to the same schema as used for the network topology information, network alarm information, network event information, and network command specifications for the example network configuration record 420 used to train the network operation model 450.

The system-test component 460 generates a system-test network operation record 470 based on the system-test network configuration record 420 using the network operation model 450. The system-test network operation record comprises one or more of the network alarm alerts, network event alerts, network alarm data, and network event data. The network alarm alerts, network event alerts, network alarm data, and network event data are specified according to the same schema as used for the network alarm alerts, network event alerts, network alarm data, and network event data used to train the network operation model 450. The system-test network operation record 470 may comprise a plurality of system-test key-value pairs for system-test output parameters of a plurality of system-test network elements of a system-test network configuration represented by the system-test network configuration record 420.

The network management application 480 then receives the system-test network operation record 470. In some cases, the system-test component 460 may directly provide the system-test network operation record 470 to the network management application 480. In other cases, the system-test component 460 may provide the system-test network operation record 470 to the operator console 410, with the operator console 410 then being used to have the network management application 480 run the system-test network operation record 470. The system-test network operation record 470 may be executed by a network simulator 140 as described with reference to FIG. 1 for the display of information by the network management application 480 as a client application 120 to the network simulator 140.

The network modeling system 100 may support hybrid network elements. The example network configuration record 420 may comprise a first network configuration information for a first network element type and second network configuration information for a second network element type. Correspondingly, the example network operation record 425 may comprise network operation information for the first network element type and the second network element type. As such, the network operation model 450 may embody the operation of network elements of both the first network element type and the second network element type.

The system-test network configuration record 420 may thereafter comprise a hybrid network configuration information for a hybrid network element type combining the first network element type and the second network element type. The network operation model 450 based on the example network configuration record is operative to generate the system-test network operation record 470 with hybrid network operation information for the hybrid network element type based on the network operation model 450 having been trained on the first network element type and the second network element type, without having been trained on any network elements of the hybrid network element type. This may be performed by specifying the hybrid network element type using a combination of parameters used to define the first network element type and the second network element type.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 5:
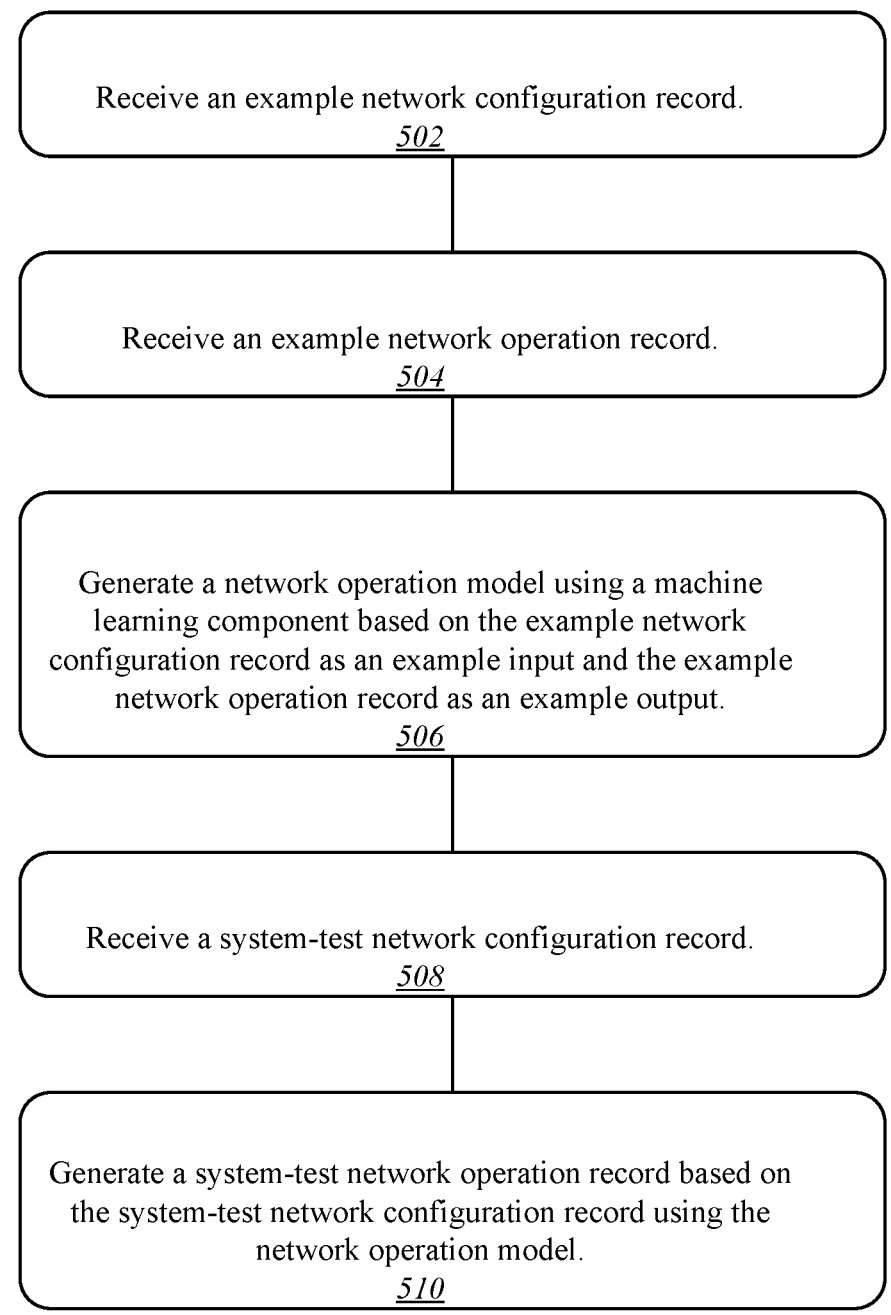
FIG. 5 illustrates an embodiment of a logic flow for the system of FIG. 1.

FIG. 5 illustrates one embodiment of a logic flow 500. The logic flow 500 may be representative of some or all of the operations executed by one or more embodiments described herein. In the illustrated embodiment shown in FIG. 5, the logic flow 500 may receive an example network configuration record at block 502 and network operation record at block 504. The logic flow 500 may generate a network operation model using a machine learning component based on the example network configuration record as an example input and the example network operation record as an example output at block 506.

The logic flow 500 may receive a system-test network configuration record at block 508 and generate a system-test network operation record based on the system-test network configuration record using the network operation model at block 510. The embodiments are not limited to this example.

Figure 6:
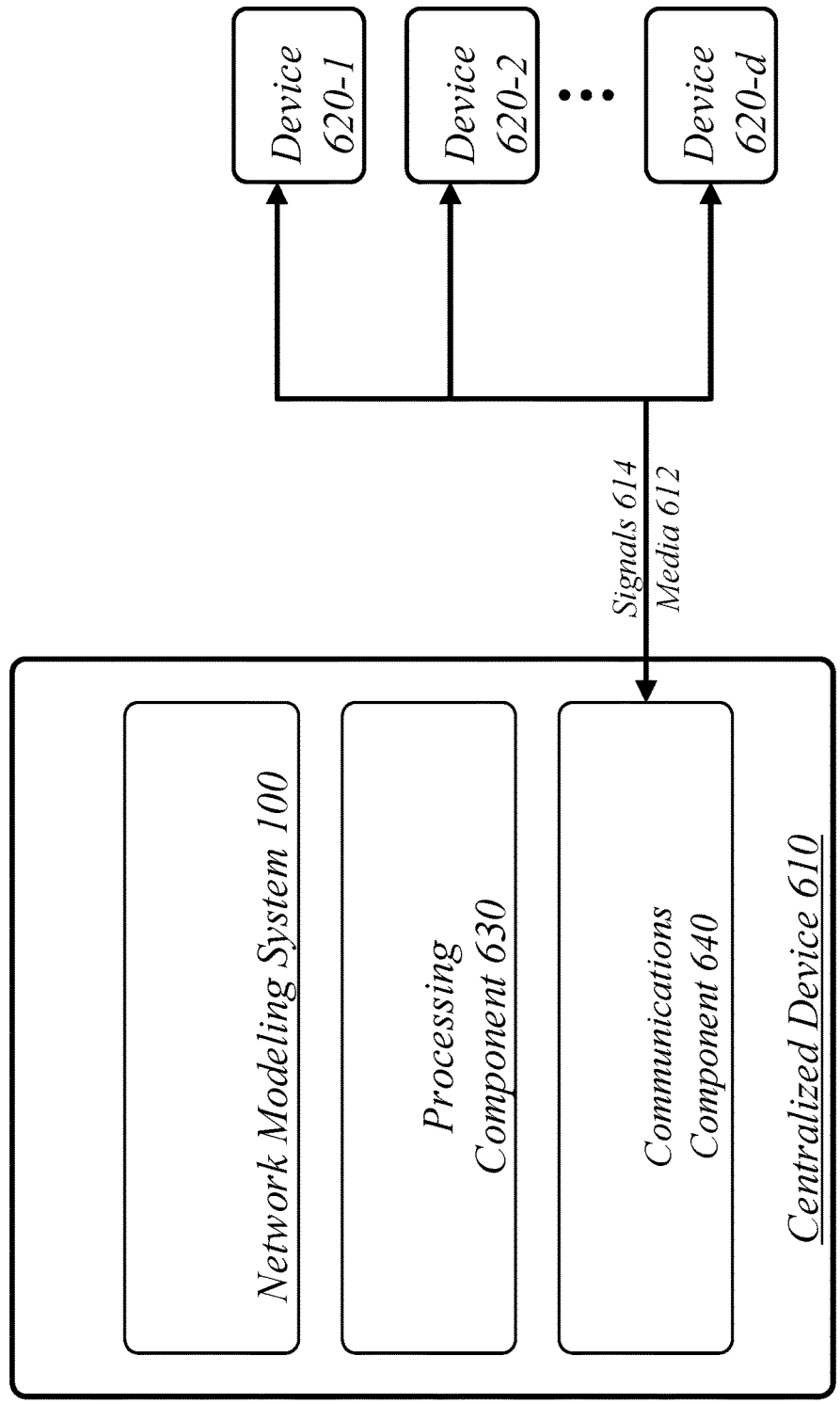
FIG. 6 illustrates an embodiment of a centralized system for the system of FIG. 1.

FIG. 6 illustrates a block diagram of a centralized system 600. The centralized system 600 may implement some or all of the structure and/or operations for the network modeling system 100 in a single computing entity, such as entirely within a single centralized device 610. The centralized device 610 may comprise any electronic device capable of receiving, processing, and sending information for the network modeling system 100. Examples of an electronic device may include without limitation an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The centralized device 610 may execute processing operations or logic for the network modeling system 100 using a processing component 630. The processing component 630 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The centralized device 610 may execute communications operations or logic for the network modeling system 100 using communications component 640. The communications component 640 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 640 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 612 includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The centralized device 610 may communicate with other devices 620 over a communications media 612 using communications signals 614 via the communications component 640. The devices 620 may be internal or external to the centralized device 610 as desired for a given implementation. The devices 620 may comprise various devices with which the network modeling system 100 interacts. For instance, the devices 620 may comprise operating network elements from which the network modeling system 100 gathers performance data.

The centralized device 610 may execute the network modeling system 100 as a centralized system 600. The components of the network modeling system 100 may execute on the centralized device 610 for use by operators of the network modeling system 100.

Figure 7:
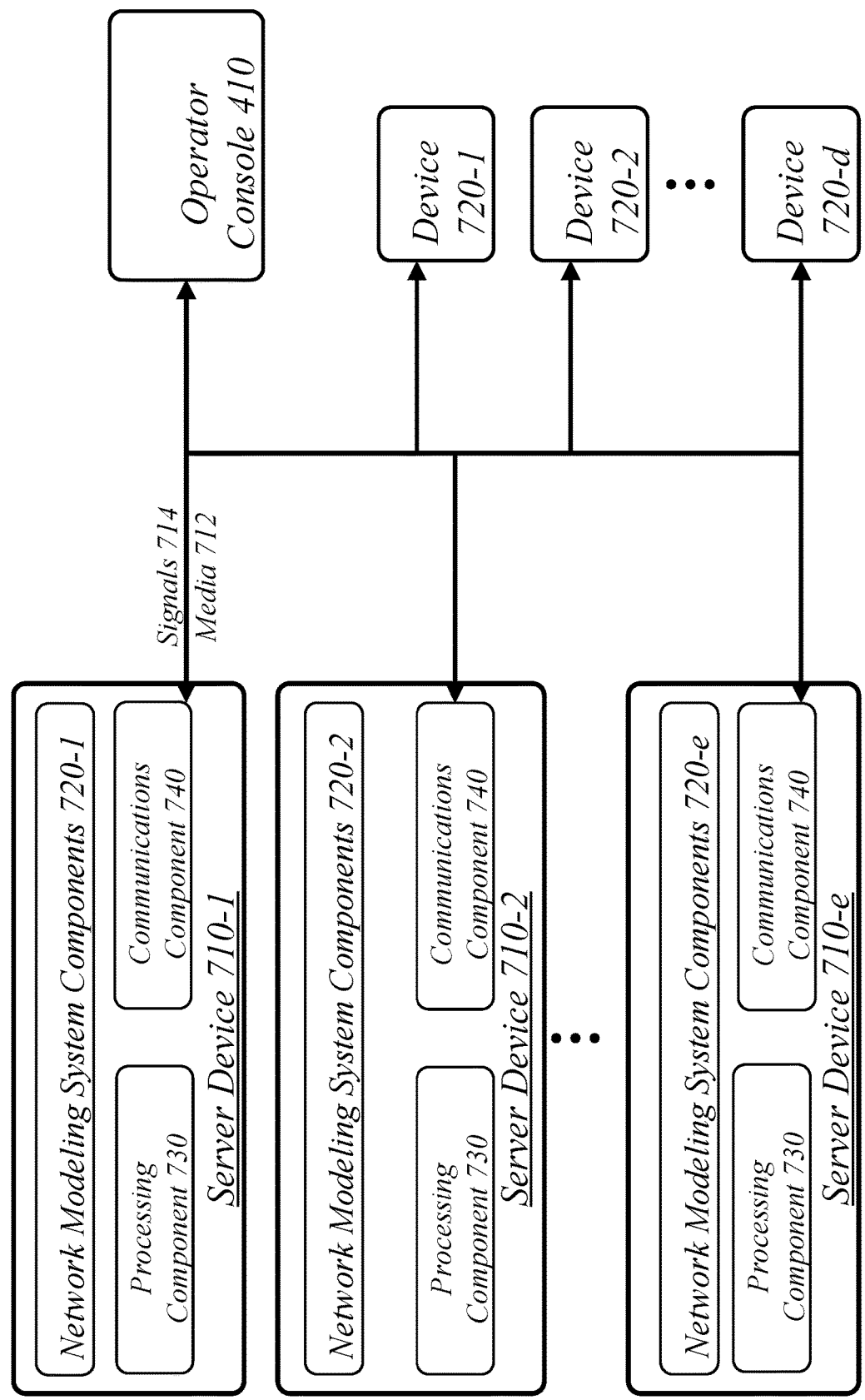
FIG. 7 illustrates an embodiment of a distributed system for the system of FIG. 1.

FIG. 7 illustrates a block diagram of a distributed system 700. The distributed system 700 may distribute portions of the structure and/or operations for the network modeling system 100 across multiple computing entities. Examples of distributed system 700 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 700 may comprise a plurality of server devices 710. In general, the server devices 710 may be the same or similar to the centralized device 610 as described with reference to FIG. 6. For instance, the server devices 710 may each comprise a processing component 730 and a communications component 740 which are the same or similar to the processing component 630 and the communications component 640, respectively, as described with reference to FIG. 6. In another example, the server devices 710 may communicate over a communications media 712 using communications signals 714 via the communications components 740.

The server devices 710 may execute network modeling system component 720, such as network modeling system 100 components described with reference to FIG. 1-4. The distributed system 700 may distribute the components of the network modeling system 100 across the different server devices 710. The server devices 710 may be operated by the operator console 410 for the performance of network modeling operations.

The server devices 710 may communicate with other devices 720 over the communications media 712 using communications signals 714 via the communications components 740. The devices 720 may comprise various devices with which the network modeling system 100 interacts. For instance, the devices 720 may comprise operating network elements from which the network modeling system 100 gathers performance data.

Figure 8:
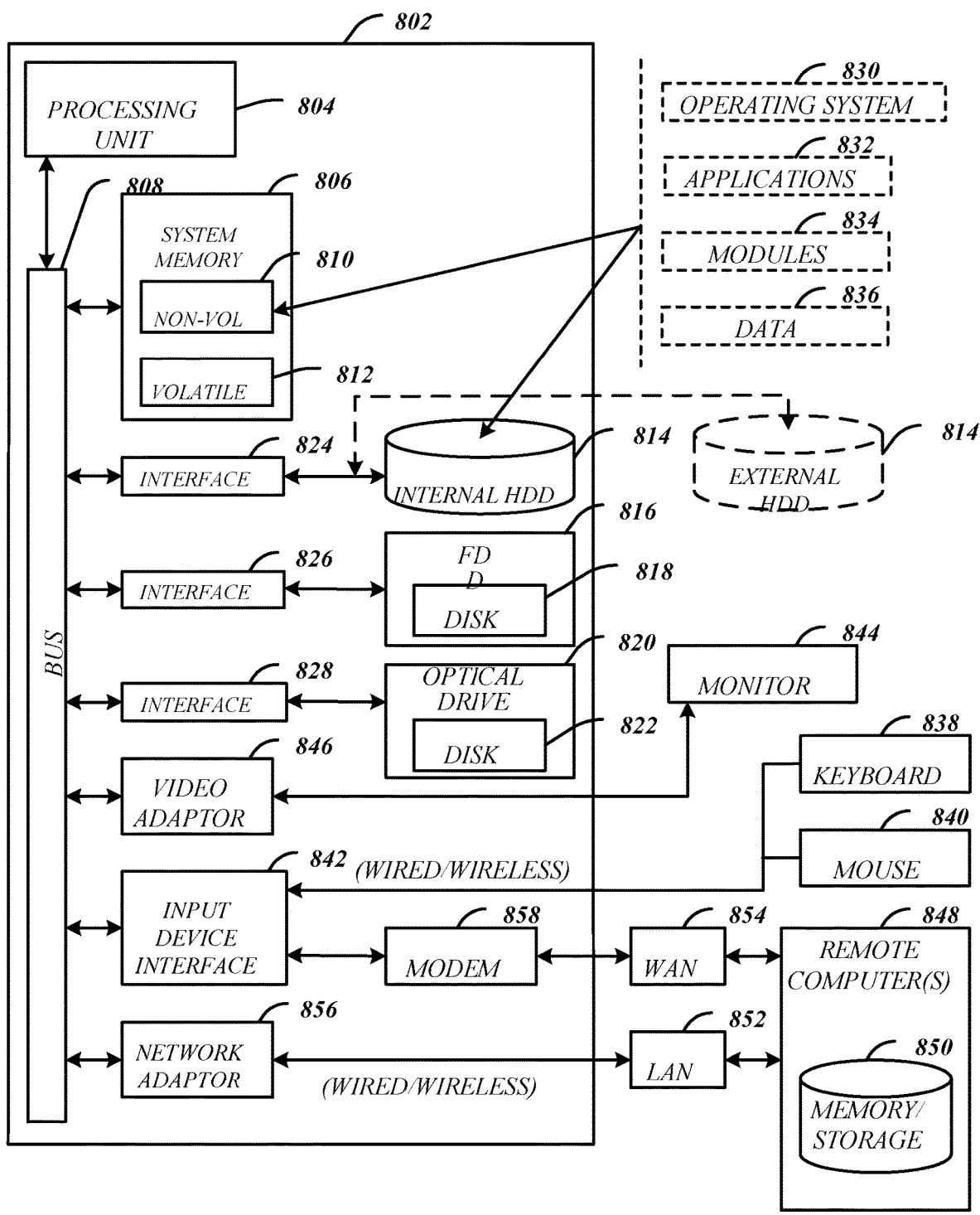
FIG. 8 illustrates an embodiment of a computing architecture.

FIG. 8 illustrates an embodiment of an exemplary computing architecture 800 suitable for implementing various embodiments as previously described. In one embodiment, the computing architecture 800 may comprise or be implemented as part of an electronic device. Examples of an electronic device may include those described with reference to FIG. 8, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 800. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 800 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 800.

As shown in FIG. 8, the computing architecture 800 comprises a processing unit 804, a system memory 806 and a system bus 808. The processing unit 804 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 804.

The system bus 808 provides an interface for system components including, but not limited to, the system memory 806 to the processing unit 804. The system bus 808 can be any of several types of bus structure that may further interconnect to a memory bus (with or without a memory controller), a peripheral bus, and a local bus using any of a variety of commercially available bus architectures. Interface adapters may connect to the system bus 808 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 800 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 806 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 8, the system memory 806 can include non-volatile memory 810 and/or volatile memory 812. A basic input/output system (BIOS) can be stored in the non-volatile memory 810.

The computer 802 may include various types of computer-readable storage media in the form of one or more lower speed memory units, including an internal (or external) hard disk drive (HDD) 814, a magnetic floppy disk drive (FDD) 816 to read from or write to a removable magnetic disk 818, and an optical disk drive 820 to read from or write to a removable optical disk 822 (e.g., a CD-ROM or DVD). The HDD 814, FDD 816 and optical disk drive 820 can be connected to the system bus 808 by a HDD interface 824, an FDD interface 826 and an optical drive interface 828, respectively. The HDD interface 824 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 810, 812, including an operating system 830, one or more application programs 832, other program modules 834, and program data 836. In one embodiment, the one or more application programs 832, other program modules 834, and program data 836 can include, for example, the various applications and/or components of the network modeling system 100.

A user can enter commands and information into the computer 802 through one or more wire/wireless input devices, for example, a keyboard 838 and a pointing device, such as a mouse 840. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 804 through an input device interface 842 that is coupled to the system bus 808, but can be connected by other interfaces such as a parallel port, IEEE 1394 serial port, a game port, a USB port, an IR interface, and so forth.

A monitor 844 or other type of display device is also connected to the system bus 808 via an interface, such as a video adaptor 846. The monitor 844 may be internal or external to the computer 802. In addition to the monitor 844, a computer typically includes other peripheral output devices, such as speakers, printers, and so forth.

The computer 802 may operate in a networked environment using logical connections via wire and/or wireless communications to one or more remote computers, such as a remote computer 848. The remote computer 848 can be a workstation, a server computer, a router, a personal computer, portable computer, microprocessor-based entertainment appliance, a peer device or other common network node, and typically includes many or all of the elements described relative to the computer 802, although, for purposes of brevity, only a memory/storage device 850 is illustrated. The logical connections depicted include wire/wireless connectivity to a local area network (LAN) 852 and/or larger networks, for example, a wide area network (WAN) 854. Such LAN and WAN networking environments are commonplace in offices and companies, and facilitate enterprise-wide computer networks, such as intranets, all of which may connect to a global communication network, for example, the Internet.

When used in a LAN networking environment, the computer 802 is connected to the LAN 852 through a wire and/or wireless communication network interface or adaptor 856. The adaptor 856 can facilitate wire and/or wireless communications to the LAN 852, which may also include a wireless access point disposed thereon for communicating with the wireless functionality of the adaptor 856.

When used in a WAN networking environment, the computer 802 can include a modem 858, or is connected to a communications server on the WAN 854, or has other means for establishing communications over the WAN 854, such as by way of the Internet. The modem 858, which can be internal or external and a wire and/or wireless device, connects to the system bus 808 via the input device interface 842. In a networked environment, program modules depicted relative to the computer 802, or portions thereof, can be stored in the remote memory/storage device 850. It will be appreciated that the network connections shown are exemplary and other means of establishing a communications link between the computers can be used.

The computer 802 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 9:
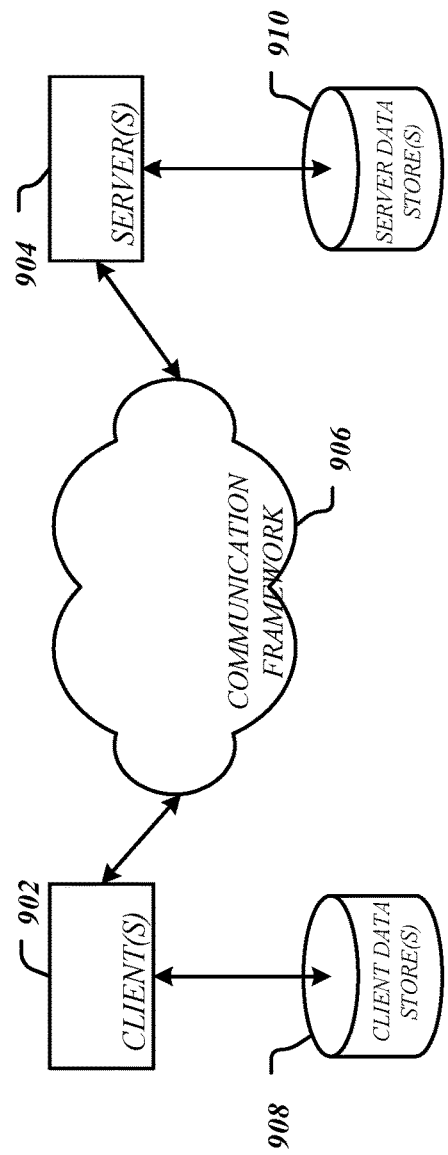
FIG. 9 illustrates an embodiment of a communications architecture.

FIG. 9 illustrates a block diagram of an exemplary communications architecture 900 suitable for implementing various embodiments as previously described. The communications architecture 900 includes various common communications elements, such as a transmitter, receiver, transceiver, radio, network interface, baseband processor, antenna, amplifiers, filters, power supplies, and so forth. The embodiments, however, are not limited to implementation by the communications architecture 900.

As shown in FIG. 9, the communications architecture 900 comprises includes one or more clients 902 and servers 904. The clients 902 may implement the operator console 410 as described with reference to FIG. 4. The servers 904 may implement server devices, such as the server devices 710 described with reference to FIG. 7. The clients 902 and the servers 904 are operatively connected to one or more respective client data stores 908 and server data stores 910 that can be employed to store information local to the respective clients 902 and servers 904, such as cookies and/or associated contextual information.

The clients 902 and the servers 904 may communicate information between each other using a communication framework 906. The communications framework 906 may implement any well-known communications techniques and protocols. The communications framework 906 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 906 may implement various network interfaces arranged to accept, communicate, and connect to a communication network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communication network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 902 and the servers 904. A communication network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communication networks.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A computer-implemented method comprising:
receiving an example network configuration record representing a configuration of a network of the optical communication system;
receiving an example network operation record representing a behavior of the network;

generating a network operation model configured to simulate an optical communication system, the network operation model generated using a machine learning component based on the example network configuration record as an example input and the example network operation record as an example output, the network operation model configured to produce monitoring information that a network management application would be presented given a particular configuration of the network, set of commands into the network, and events within the network;
receiving a system-test network configuration record; and
generating a system-test network operation record based on the system-test network configuration record using the network operation model.

2. The method of claim 1, further comprising:
providing the system-test network operation record to the network management application.

3. The method of claim 1, the example network operation record comprising a plurality of example key-value pairs for example output parameters of a plurality of example network elements of an example network configuration represented by the example network configuration record, the system-test network operation record comprising a plurality of system-test key-value pairs for system-test output parameters of a plurality of system-test network elements of an system-test network configuration represented by the system-test network configuration record.

4. The method of claim 1, the example network configuration record and the system-test network configuration record comprising network topology information, network alarm information, network event information, and network command specifications.

5. The method of claim 1, the example network operation record and the system-test network operation record comprising network alarm alerts, network event alerts, network alarm data, and network event data.

6. The method of claim 1, the example network configuration record comprising first network configuration information for a first network element type and second network configuration information for a second network element type, the example network operation record comprising network operation information for the first network element type and the second network element type, system-test network configuration record comprising hybrid network configuration information for a hybrid network element type combining the first network element type and the second network element type, the network operation model based on the example network configuration record operative to generate the system-test network operation record with hybrid network operation information for the hybrid network element type.

7. The method of claim 1, the example network configuration record corresponding to an operating network, the example network operation record comprising operating data collected for the operating network.

8. The method of claim 1, the machine learning component comprising a simulation file generator, wherein generating a network operation model using a machine learning component comprises iteratively submitting the example network configuration record to the simulation file generator, receiving an attempted network operation record, and iterating through configuration settings of the simulation file generator where the attempted network operation record does not match the example network operation record.

9. An apparatus comprising:
a records component operative to receive an example network configuration record representing a configuration of a network of the undersea fiber optic cable system and to receive an example network operation record representing a behavior of the network;
a machine learning management component operative to generate a network operation model configured to simulate an undersea fiber optic cable system, the network operation model generated using a machine learning component based on the example network configuration record as an example input and the example network operation record as an example output, the network operation model configured to produce monitoring information that a network management application would be presented given a particular configuration of the network, set of commands into the network, and events within the network; and
a system-test component operative to receive a system-test network configuration record; and generate a system-test network operation record based on the system-test network configuration record using the network operation model.

10. The apparatus of claim 9, the example network operation record comprising a plurality of example key-value pairs for example output parameters of a plurality of example network elements of an example network configuration represented by the example network configuration record, the system-test network operation record comprising a plurality of system-test key-value pairs for system-test output parameters of a plurality of system-test network elements of an system-test network configuration represented by the system-test network configuration record.

11. The apparatus of claim 9, the example network configuration record and the system-test network configuration record comprising network topology information, network alarm information, network event information, and network command specifications.

12. The apparatus of claim 9, the example network operation record and the system-test network operation record comprising network alarm alerts, network event alerts, network alarm data, and network event data.

13. The apparatus of claim 9, the example network configuration record comprising first network configuration information for a first network element type and second network configuration information for a second network element type, the example network operation record comprising network operation information for the first network element type and the second network element type, system-test network configuration record comprising hybrid network configuration information for a hybrid network element type combining the first network element type and the second network element type, the network operation model based on the example network configuration record operative to generate the system-test network operation record with hybrid network operation information for the hybrid network element type.

14. The apparatus of claim 9, the machine learning component comprising a simulation file generator, wherein generating a network operation model using a machine learning component comprises iteratively submitting the example network configuration record to the simulation file generator, receiving an attempted network operation record, and iterating through configuration settings of the simulation file generator where the attempted network operation record does not match the example network operation record.

15. At least one non-transitory computer-readable storage medium comprising instructions that, when executed, cause a system to:
- receive an example network configuration record representing a configuration of a network;
- receive an example network operation record representing a behavior of the network;
- generate a network operation model configured to simulate an optical communication system, the network operation model generated using a machine learning component based on the example network configuration record as an example input and the example network operation record as an example output, the network operation model configured to produce monitoring information that a network management application would be presented given a particular configuration of the network, set of commands into the network, and events within the network;
- receive a system-test network configuration record; and
- generate a system-test network operation record based on the system-test network configuration record using the network operation model.

16. The computer-readable storage medium of claim 15, the example network operation record comprising a plurality of example key-value pairs for example output parameters of a plurality of example network elements of an example network configuration represented by the example network configuration record, the system-test network operation record comprising a plurality of system-test key-value pairs for system-test output parameters of a plurality of system-test network elements of an system-test network configuration represented by the system-test network configuration record.

17. The computer-readable storage medium of claim 15, the example network configuration record and the system-test network configuration record comprising network topology information, network alarm information, network event information, and network command specifications.

18. The computer-readable storage medium of claim 15, the example network operation record and the system-test network operation record comprising network alarm alerts, network event alerts, network alarm data, and network event data.

19. The computer-readable storage medium of claim 15, the example network configuration record comprising first network configuration information for a first network element type and second network configuration information for a second network element type, the example network operation record comprising network operation information for the first network element type and the second network element type, system-test network configuration record comprising hybrid network configuration information for a hybrid network element type combining the first network element type and the second network element type, the network operation model based on the example network configuration record operative to generate the system-test network operation record with hybrid network operation information for the hybrid network element type.

20. The computer-readable storage medium of claim 15, the machine learning component comprising a simulation file generator, wherein generating a network operation model using a machine learning component comprises iteratively submitting the example network configuration record to the simulation file generator, receiving an attempted network operation record, and iterating through configuration settings of the simulation file generator where the attempted network operation record does not match the example network operation record.

* * * * *